Patented Nov. 3, 1925.

1,559,599

UNITED STATES PATENT OFFICE.

VICTOR WINTSCH, JR., OF ZURICH, SWITZERLAND, ASSIGNOR TO R. H. COMEY COMPANY, OF CAMDEN, NEW JERSEY, A CORPORATION OF NEW JERSEY.

STABILIZING SOLUTION CONTAINING LOOSELY-COMBINED OXYGEN.

No Drawing. Application filed June 25, 1924. Serial No. 722,415.

*To all whom it may concern:*

Be it known that I, VICTOR WINTSCH, Jr., a citizen of the Swiss Confederation, residing at Bachtoldstrasse 7, Zurich, Switzerland, have invented new and useful Improvements in Stabilizing Solutions Containing Loosely-Combined Oxygen, of which the following is a specification.

Many stabilizers for retarding the liberation of oxygen in solution containing loosely combined oxygen are known.

It is a well known fact that solutions of peroxide of hydrogen and sodium perborate, and solutions of all such compounds containing active oxygen readily liberate their oxygen and especially so in connection with bleaching, for instance the bleaching of vegetable fibers. This property results in the uneconomical use of such compounds, especially so, for instance when they are to be used for the purpose of obtaining very white results. In order that the economic use of such compounds may be obtained, various stabilizers have from time to time been invented: by means of the present invention a superior degree of efficiency in the economic exploitation of the oxygen can be effected.

For example, at high temperatures such a bleaching bath containing active oxygen being maintained at 75 degrees Celsius, lost its oxygen in a few hours whereas a solution of a bleaching bath containing active oxygen and 1% of sodium pyrophosphate salicylate only lost approximately a tenth of the oxygen in twenty-four hours.

This invention is also applicable for conserving the oxygen in any solution containing loosely combined oxygen regardless of whether it is for bleaching bath or not: for instance the conserving of oxygen in any solution containing loosely combined or active oxygen, for storing. Although sodium pyrophosphate has been mentioned as an example potassium or similar pyrophosphates may be used.

In my co-pending application, Serial No. 722,416, filed on even date herewith and entitled "Stabilizer of solutions containing loosely combined oxygen and process of manufacturing the same," I have described and claimed pyrophosphate salicylates and the manufacture thereof.

Having thus described my invention, I claim as new

1. The stabilization of solutions containing loosely combined oxygen with alkali metal pyrophosphate salicylate.

2. The stabilization of solutions containing loosely combined oxygen with sodium pyrophosphate salicylate.

3. A preparation for slowly liberating oxygen comprising material containing loosely combined oxygen and an alkali metal pyrophosphate salicylate.

4. A preparation for slowly liberating oxygen comprising material containing loosely combined oxygen and sodium pyrophosphate salicylate.

5. The stabilization of solutions containing loosely combined oxygen with a soluble pyrophosphate salicylate.

6. A preparation for slowly liberating oxygen comprising material containing loosely combined oxygen and a soluble pyrophosphate salicylate.

In testimony whereof I have signed my name to this specification.

VICTOR WINTSCH, JR.